(12) United States Patent
Schwer et al.

(10) Patent No.: US 10,076,071 B2
(45) Date of Patent: Sep. 18, 2018

(54) MACHINE FOR HARVESTING FODDER

(71) Applicant: KUHN S.A., Saverne (FR)

(72) Inventors: Michael Schwer, Bourscheid (FR); Joel Wilhelm, Saint Louis (FR)

(73) Assignee: KUHN S.A., Saverne (FR)

( * ) Notice: Subject to any disclaimer, the term of this patent is extended or adjusted under 35 U.S.C. 154(b) by 73 days.

(21) Appl. No.: 15/227,558

(22) Filed: Aug. 3, 2016

(65) Prior Publication Data
US 2016/0338259 A1 Nov. 24, 2016

Related U.S. Application Data

(63) Continuation of application No. 14/321,014, filed on Jul. 1, 2014, now abandoned.

(30) Foreign Application Priority Data

Jul. 17, 2013 (FR) .................................... 13 57004

(51) Int. Cl.
*A01B 73/04* (2006.01)
*A01B 73/02* (2006.01)
(Continued)

(52) U.S. Cl.
CPC ............ *A01B 73/044* (2013.01); *A01B 63/24* (2013.01); *A01B 73/02* (2013.01); *A01D 78/001* (2013.01); *A01D 78/14* (2013.01); *A01D 87/02* (2013.01)

(58) Field of Classification Search
CPC ..... A01B 73/02; A01B 73/044; A01B 73/067; A01B 73/005; A01B 63/24; A01D 78/001;
(Continued)

(56) References Cited

U.S. PATENT DOCUMENTS 3,177,638 A * 4/1965 Johnson ............... A01B 73/067
172/456
3,545,033 A * 12/1970 Couser ................... A01B 49/02
16/370
(Continued)

FOREIGN PATENT DOCUMENTS

EP 0 715 804 A1 6/1996
EP 0 900 515 A2 3/1999
(Continued)

OTHER PUBLICATIONS

Preliminary Search Report and Written Opinion issued in French Patent Application No. 1357004 dated Feb. 13, 2014.

*Primary Examiner* — Alicia Torres
*Assistant Examiner* — Adam J Behrens
(74) *Attorney, Agent, or Firm* — Oblon, McClelland, Maier & Neustadt, L.L.P.

(57) ABSTRACT

A machine for the harvesting of plants comprises an arm movable between work and transport configuration, a tool comprising lateral ends and being able to occupy a work position and another position, a connecting device via which the tool is connected to the arm and enabling a first movement of the tool relative to the arm, during which the lateral ends move vertically relative to the arm in the same vertical direction relative thereto, the connecting device can operate a second transverse and horizontal movement of the tool relative to the arm and making it possible to operate this second movement independently of the first movement. The connecting device comprises an arm articulated on the support arm about a first transverse and horizontal axis when the support arm is in the work configuration, and this arm can, by pivoting about the first axis, moved vertically relative to the support arm.

10 Claims, 8 Drawing Sheets

(51) Int. Cl.
*A01D 78/00* (2006.01)
*A01D 87/02* (2006.01)
*A01B 63/24* (2006.01)
*A01D 78/14* (2006.01)

(58) Field of Classification Search
CPC ...... A01D 78/14; A01D 78/148; A01D 87/02; A01D 84/00; A01D 84/02; A01D 89/00–89/008; A01D 34/661; A01D 34/74
See application file for complete search history.

(56) References Cited

U.S. PATENT DOCUMENTS

| | | | |
|---|---|---|---|
| 3,646,733 A | | 3/1972 | Clapsaddle |
| 4,077,189 A | | 3/1978 | Hering |
| 4,381,118 A | | 4/1983 | Weeks |
| 4,502,269 A | | 3/1985 | Cartner |
| 4,502,545 A | * | 3/1985 | Couser ................ A01B 73/067 172/311 |
| 4,753,063 A | | 6/1988 | Buck |
| 4,768,334 A | * | 9/1988 | Honey ................ A01L 373/005 56/15.2 |
| 4,937,759 A | | 6/1990 | Vold |
| 4,974,399 A | | 12/1990 | Haberkorn |
| 5,423,165 A | | 6/1995 | Walch |
| 5,775,075 A | | 7/1998 | Dannar |
| 5,784,542 A | | 7/1998 | Ohm |
| 5,911,625 A | | 6/1999 | Von Allworden |
| 6,038,844 A | | 3/2000 | Peeters |
| 6,675,907 B2 | | 1/2004 | Moser |
| 7,175,380 B2 | | 2/2007 | Wilson |
| 7,543,433 B2 | | 6/2009 | Hironimus |
| 8,091,331 B2 | | 1/2012 | Dow |
| 8,186,138 B2 | | 5/2012 | Dow et al. |
| 8,442,686 B2 | | 5/2013 | Saito |
| 8,919,088 B2 | * | 12/2014 | Dow ....................... A01B 73/00 56/192 |
| 9,038,358 B2 | | 5/2015 | Landon |
| 2002/0017389 A1 | | 2/2002 | Moser |
| 2005/0138911 A1 | | 6/2005 | Wilson |
| 2006/0254244 A1 | | 11/2006 | Geiser |
| 2007/0079976 A1 | | 4/2007 | Jagow |
| 2009/0241503 A1 | | 10/2009 | Babler |
| 2010/0037584 A1 | | 2/2010 | Dow et al. |
| 2011/0047948 A1 | * | 3/2011 | Thompson ........... A01D 34/661 56/17.1 |
| 2011/0094200 A1 | | 4/2011 | Dow et al. |
| 2011/0094202 A1 | | 4/2011 | Dow et al. |
| 2011/0173940 A1 | * | 7/2011 | Priepke ................ A01D 34/661 56/6 |
| 2012/0247076 A1 | | 10/2012 | Landon |
| 2013/0000268 A1 | | 1/2013 | Arnold |
| 2013/0014481 A1 | * | 1/2013 | Dow ....................... A01B 73/00 56/13.5 |
| 2013/0118141 A1 | | 5/2013 | Arnold |
| 2014/0060861 A1 | | 3/2014 | Blunier |
| 2014/0260168 A1 | | 9/2014 | Clark |

FOREIGN PATENT DOCUMENTS

| | | | |
|---|---|---|---|
| EP | 0715804 B1 * | 11/2001 | ........... A01D 78/001 |
| EP | 1405556 A2 * | 4/2004 | ........... A01D 34/661 |
| WO | WO-9302542 A1 * | 2/1993 | ........... A01B 59/064 |
| WO | 2011/112077 A1 | 9/2011 | |

* cited by examiner

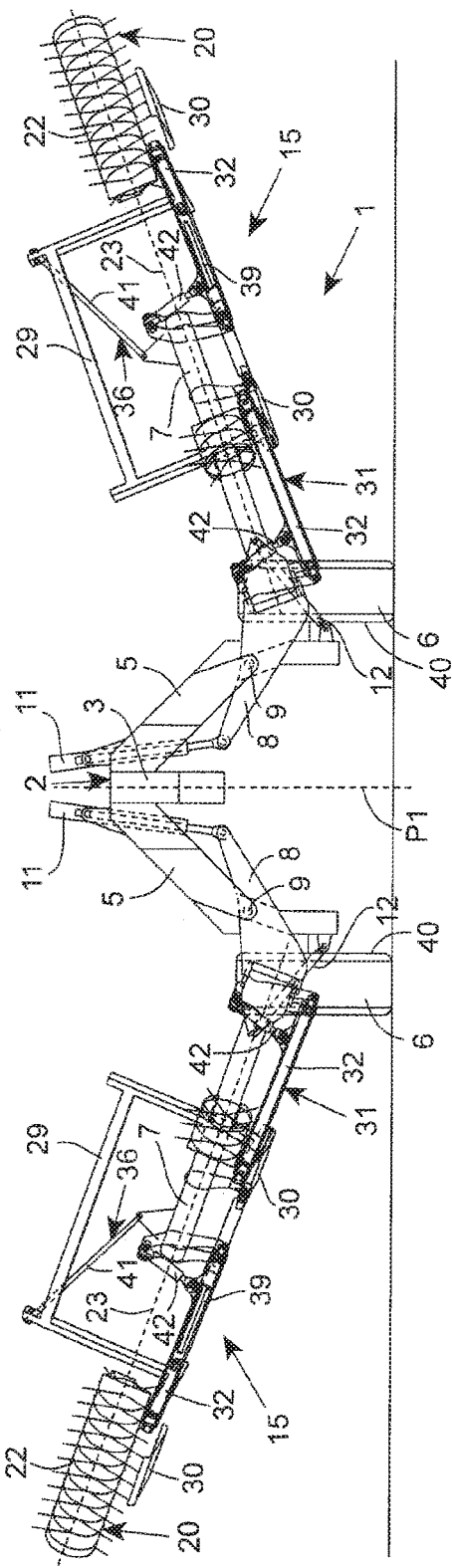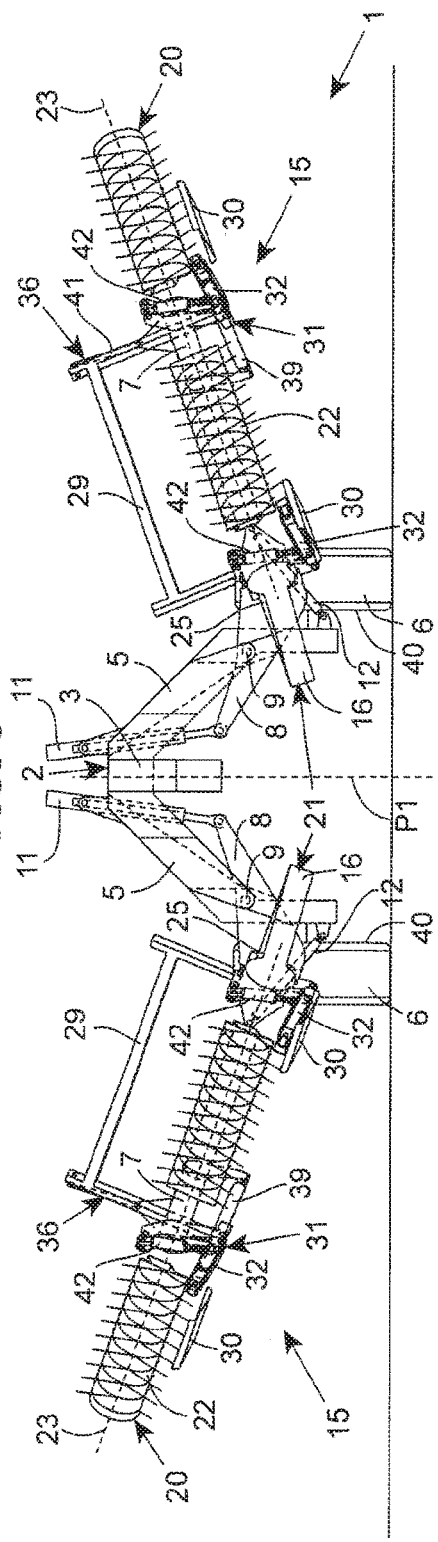

MACHINE FOR HARVESTING FODDER

CROSS-REFERENCE TO RELATED APPLICATIONS

This application is a continuation of U.S. application Ser. No. 14/321,014 filed Jul. 1, 2014, the entire contents of which is incorporated herein by reference. U.S. application Ser. No. 14/321,014 claims the benefit of priority from prior French Application No. 13 57004 filed Jul. 17, 2013.

BACKGROUND OF THE INVENTION

Field of the Invention

The present invention relates to an agricultural machine for the harvesting of plants, in particular of fodder, this machine being movable in a direction of advance and comprising in particular:
- a chassis,
  - at least one support arm articulated on the chassis and movable with respect to the chassis between work configuration in which the support arm extends laterally with respect to the chassis, and a transport configuration in which the support arm is folded such that its overall dimension perpendicularly to the direction of advance (A) is reduced,
  - at least one work tool comprising an inner lateral end and an outer lateral end, and being able to occupy at least one work position in which the work tool acts on plants lying on the ground, and at least another position,
  - a connecting device, by means of which a frame of the work tool is connected to the support arm, this connecting device allowing at least when the support arm is in the work configuration, a first movement of the work tool with respect to the support arm during which the inner lateral end and the outer lateral end of the work tool move vertically with respect to the support arm and in the same vertical direction with respect thereto.

Discussion of the Background

A machine of this type is known from the document U.S. Pat. No. 8,186,138 B2. This machine is of the type known under the name of "Merger". This machine comprises a chassis designed to be hitched to the rear of a tractor and supported on the ground by wheels in its rear part. On at least one lateral side of the chassis a support arm, carrying a work tool, is articulated. This support arm can be placed in a work configuration in which the work tool extends perpendicularly to the direction of advance and substantially horizontally. The work tool comprises a toothed rotor which, during work, extends perpendicularly to the direction of advance and picks up the plants lying on the ground. The picked up plants are moved towards the rear by the rotor, in the direction of a belt conveyor which moves the plants perpendicularly to the direction of advance, in the direction of a lateral side of the work tool. On the known machine, the work tool is, in its rear part, connected to a support by means of an axis oriented horizontally and parallel to the direction of advance when the support arm is in the work configuration. This support is, in its turn, connected to the support arm by means of a first connecting-rod and a second connecting-rod situated beneath the first connecting-rod. At each of its ends, the first connecting-rod is articulated on the support arm and on the support by means of respective physical axes which are oriented horizontally and transversely to the direction of advance when the support arm is in its work configuration. The result of this arrangement is that the first and second connecting-rods can move vertically with respect to the support arm in the work configuration, such that the work tool can, in its entirety, move upwards or downwards to follow a terrain having an uneven profile. However, this movement is solely vertical. The support arm being in the work configuration, the distance, measured horizontally and perpendicularly to the direction of advance, which separates the work tool from the chassis, remains constant. During the harvesting period, the plants can, following their mowing, be grouped together in windrows, the width and the spacing of which with respect to one another vary according to the mowers and/or windrowers which are used. One case of use of the known machine consists in that the tractor and the machine straddle a first windrow, such that this first windrow passes between the wheels of the tractor and between the wheels of the machine, and in that the work tool picks up a second windrow parallel to the first windrow and placed on a lateral side of the tractor. This second windrow is deposited by the machine on or along the first windrow, or on or along a third windrow parallel to the second windrow and placed at a greater distance from the first windrow. In such a case of use, the path of the tractor and of the machine is forced by the fact that their respective wheels must not crush the first windrow. It may therefore occur that depending on the width of the second windrow and the distance which separates it from the first windrow, this second windrow is only taken up partially by the work tool. The latter therefore leaves a portion of the second windrow which is not picked up. A complete picking up the second windrow therefore requires an additional passage of the machine, which increases the time spent in the field and the operating costs, and reduces productivity. In addition, the fact with regard to the work tool of separating the second windrow into two parts increases the risk of jamming of plants within the work tool. Furthermore, the manner in which the second windrow is redeposited on or along the first or the third windrow cannot be modified, because it is forced by the distance separating the work tool from the chassis, the wheels of which straddle the first windrow. Consequently, the shape of the new windrow, obtained by the regrouping of the second windrow and of the first or of the third windrow, is not always optimal according to the nature of the plants and the meteorological conditions which are encountered. Finally, the known machine does not allow the transverse positioning of the work tool to be modified with respect to the tractor. Consequently, it is in particular not possible to adjust the total width of the tractor/machine assembly during work.

Another machine known from the document WO 2011/112077 is in accordance with the preamble of claim 1. On this machine, the work tool is connected to the concerned support arm by means of a connecting device including a first arm and a second arm. The first arm extends substantially in the direction of advance, from a first vertical articulation axis to the support arm. At its end remote from the first axis, the first arm carries a second arm by means of a second articulation axis extending substantially in the direction of advance. This second arm extends transversely to the direction of advance and carries, at its end remote from the second axis, the frame of the concerned work tool. By pivoting of the second arm about the second axis, the work tool can move vertically. Furthermore, the second arm is telescopic so as to enable a transverse movement of the work tool. This connecting device is complex and cumbersome due to the first and second arms which extend different respective directions. In particular, the telescopic arrangement of the second arm is complicated and expensive.

Finally, during work, the second articulation axis is subjected to considerable mechanical stresses. These originate on one hand from the vertical movement of the second arm with respect to the first. On another hand, the forces which the plants moved by the machine advancing in the field exert on the work tool generate a torsion torque about a vertical axis passing through the second articulation axis. This torque is high owing to the great length of the transversely directed second arm, which can give rise to a rapid wear of the second axis.

SUMMARY OF THE INVENTION

The present invention has the aim of proposing an agricultural machine for the harvesting of plants which does not have the above-mentioned drawbacks.

To this end, the invention is characterized in that the connecting device comprises at least one arm oriented essentially in the direction of advance when the support arm is in the work configuration, that this arm is articulated on the support arm about a first axis which is oriented transversely to the direction of advance and substantially horizontally when the support arm is in the work configuration, and that this arm, by pivoting about this first axis, can move vertically with respect to the support arm in the work configuration, such that the work tool can move vertically with respect to the support arm.

Owing to the means with which the connecting device is provided, the distance, measured horizontally and perpendicularly to the direction of advance, which separates the work tool from the chassis, can be adjusted to the different work conditions. Thus, the transverse positioning of the work tool with respect to the tractor can be modified. In addition, it is possible to adjust the total width of the tractor/machine assembly during work. By the transverse movement of the work tool with respect to the support arm which they enable, the means allow the distance to be easily adjusted with respect to the chassis at which the plants harvested by the work tool are redeposited on the ground by the machine, in particular in the form of a windrow. The work tool of the machine, according to the invention, can be intended in particular to windrow plants lying on the ground. In this case, when the tractor straddles a first windrow which passes between its wheels, the means enable the work tool to be placed transversely at the suitable distance from the chassis to take up, in entirety and at one time, a second windrow placed on a lateral side of the tractor, in addition, this second windrow can be redeposited by the machine in an optimum manner on or along the first windrow, or else on or along a third windrow placed at a greater distance from the tractor, so as to obtain a new windrow of more bulky volume. The means therefore make it possible to adjust the width, the height and the general shape of this new windrow in accordance with the nature of the plants, the meteorological conditions and the processing capacity of the baler or of the chopper subsequently used to pick up this new windrow. More generally, the means enable an easy adjustment of the transverse overlap between the working widths, on one hand of the work tool of a machine according to the invention hitched to the rear of a tractor, on another hand of a work unit placed at the front of the tractor. This advantage applies of course to a work tool and to a work unit of the above-mentioned type, but also to a work tool and a work unit intended to mow plants. Furthermore, as the means allow the second movement to be operated independently of the first vertical movement of the work tool with respect to the support arm, the connecting device according to the invention allows the work tool to follow the terrain well, whatever the transverse position of the work tool with respect to the chassis. The following of the terrain is advantageously obtained by the first vertical movement of the work tool with respect to the support arm. During this first movement, the support arm can remain immobile or at least substantially immobile, such that the suspended masses, in motion during the first movement, are advantageously limited to the respective masses of the work tool and of the connecting device. Finally, the connecting device grouping together the functions of vertical movement and of transverse movement of the work tool with respect to the support arm, the technical means for articulating the support arm on the chassis and for ensuring the movements of the support arm with respect to the chassis, can be simplified and lightened. In particular, the support arm can remain immobile, or substantially immobile, with respect to the chassis when this support arm is in the work configuration. In addition, the support arm can be simplified and lightened, by being made of one part in a single piece which does not integrate articulated and/or telescopic connections.

Due to the fact that the connecting device of the frame of the work tool to the support arm comprises an arm oriented essentially in the direction of advance when the support arm is in the work configuration, the connecting device according to the invention can remain compact and light. This compactness goes together with a good following of the terrain, since during work the arm can move vertically with respect to the support arm, about the first transverse and substantially horizontal axis by which the arm is articulated on the support arm. The longitudinal orientation of the arm and the transverse orientation of the first axis allow these elements to readily resist the longitudinal forces exerted on the work tool by the moved plants. Thus, the connecting device according to the invention, connecting the frame of the work tool to the support arm, has an improved durability.

According to an advantageous feature of the invention, the means comprise a first actuator which makes it possible to move the work tool with respect to the support arm, transversely to the direction of advance, between a first transverse position with respect to the support arm, in which the inner lateral end of the work tool is moved closer to a first median vertical plane of the chassis, and a second transverse position with respect to the support arm, in which this inner lateral end is moved away from this first median vertical plane. In the first transverse position of the work tool, the width of the machine is reduced. When the machine is of the type hitched to the rear of a tractor, the inner lateral end of the work tool placed in this first transverse position is situated in the extension of the rear axle of the tractor. The work tool can then act on plants lying on the ground and situated at the rear of the tractor. In the case of a work tool intended for the windrowing of plants, the work tool can then take up a windrow passing between the wheels of the tractor for, for example, moving it in the direction the outer lateral end of the work tool. In the second transverse position of the work tool, the inner lateral end is situated for example substantially in the extension of the rear wheel of the tractor situated on the same side as that where the work tool extends with respect to the chassis of the machine. This work tool can thus act on plants situated on this side of the tractor, whether it is a work tool intended for windrowing or for mowing these plants. In particular in the case of a work tool intended for windrowing plants, the latter can pick up a lateral windrow placed on this side of the tractor, so as to redeposit it in the form of a windrow, for example more or less in the centre of the machine. A work tool intended for mowing can, in this second transverse position, mow plants present on the side of the tractor and regroup them in a lateral or more or less central windrow with respect to the machine. In the second transverse position, the work tool can have a certain overlap with a work unit placed at the front of the tractor.

According to an advantageous feature of the invention, the machine comprises two work tools each articulated on the chassis by means of a respective support arm situated on a respective side of the chassis. The means for moving each work tool thus enable an adjustment of the total working width of the machine. In addition, the means make it possible to space these work tools more or less with respect to one another with a view to adjusting the width of a windrow formed in the centre of the machine by at least one of these work tools. Furthermore, the means enable an adjustment of the overlap between the respective working widths of the work tools of a machine according to the invention hitched to the rear of a tractor, and the working width of a work unit placed at the front of the tractor.

According to another advantageous feature of the invention, when each support arm is in its respective work configuration and when at least one of the work tools is in the second transverse position with respect to the corresponding support arm, the inner lateral ends of these work tools are distinctly spaced apart from one another perpendicularly to the direction of advance (A), and when each support arm is in its respective work configuration and each work tool is in the first transverse position with respect to the corresponding support arm, the inner lateral ends of these work tools are juxtaposed. The first transverse position allows the machine to act over a continuous width of plants. Work tools intended to windrow can thus pick up a continuous width of plants, for example mown or tedded plants spread on the ground, and deposit them in a windrow on the left or right side of the machine. The second transverse position allows each work tool to act on plants distributed on the left and on the right of the machine. Work tools intended to windrow can thus form a central windrow deposited between the two work tools from plants picked up by each respective work tool, for example from two lateral windrows which are each taken up by a respective work tool.

BRIEF DESCRIPTION OF THE DRAWINGS

Other features and advantages of the invention will emerge from the following description with reference to the attached figures which represent a non-restrictive embodiment of the machine according to the invention. In these figures:

FIGS. 7 to 9 each represent a front view of the embodiment of FIG. 1, comprising some partial sections.

DESCRIPTION OF THE PREFERRED EMBODIMENT

Figure 3:
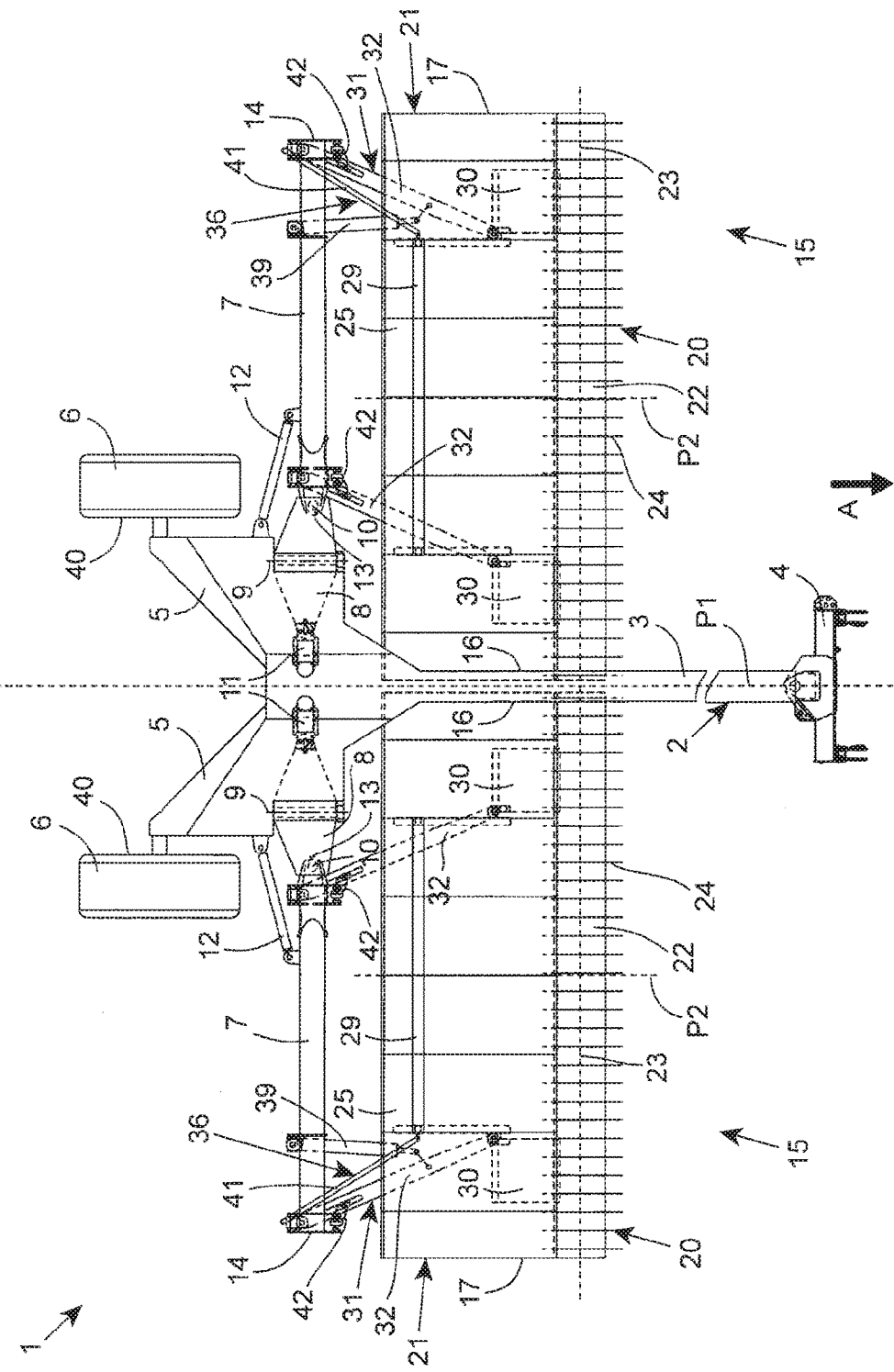
FIG. 3 represents a top view of the embodiment of FIG. 1, comprising some partial sections.
Figure 4:
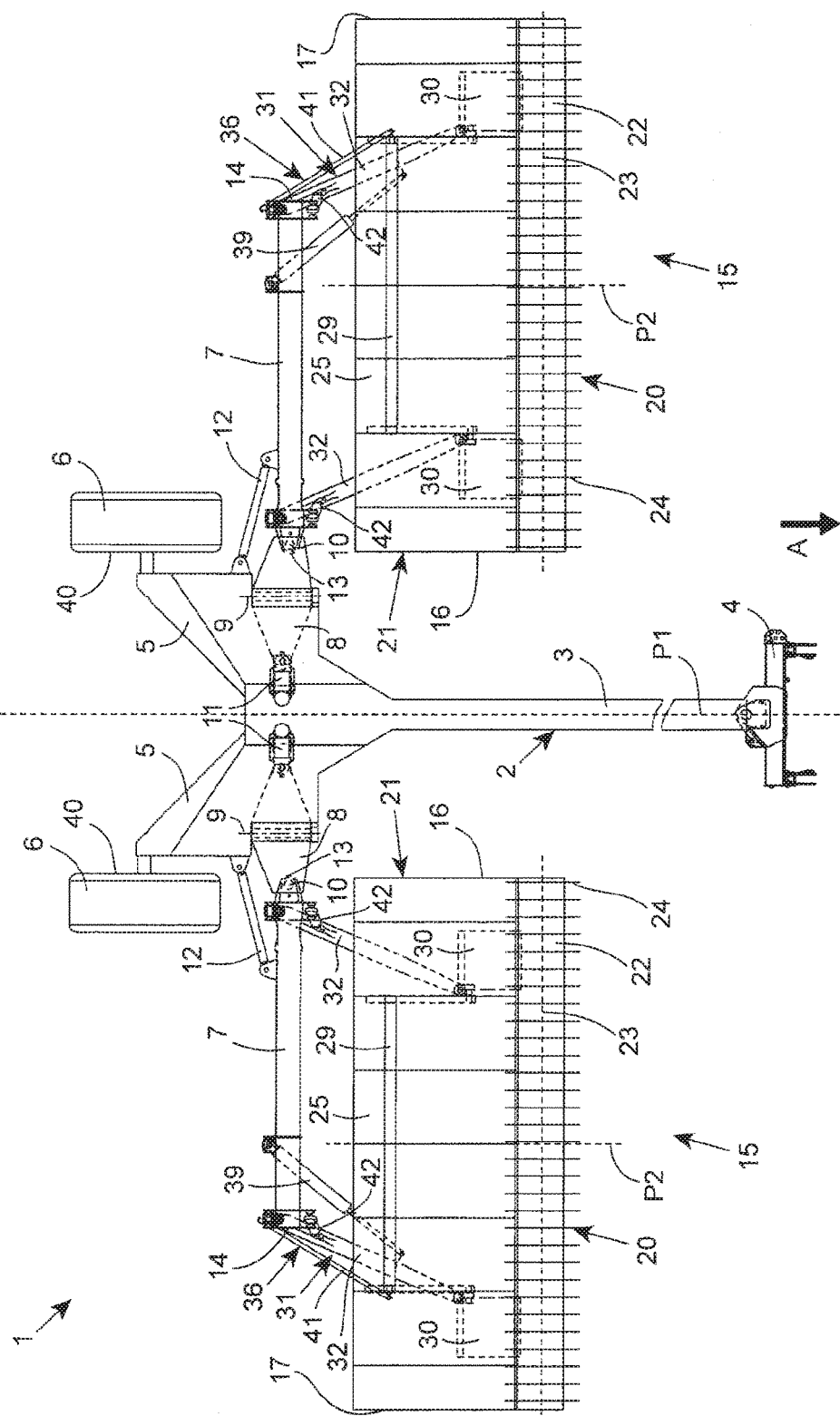
FIG. 4 represents a top view of the embodiment of FIG. 1, comprising some partial sections.
Figure 5:
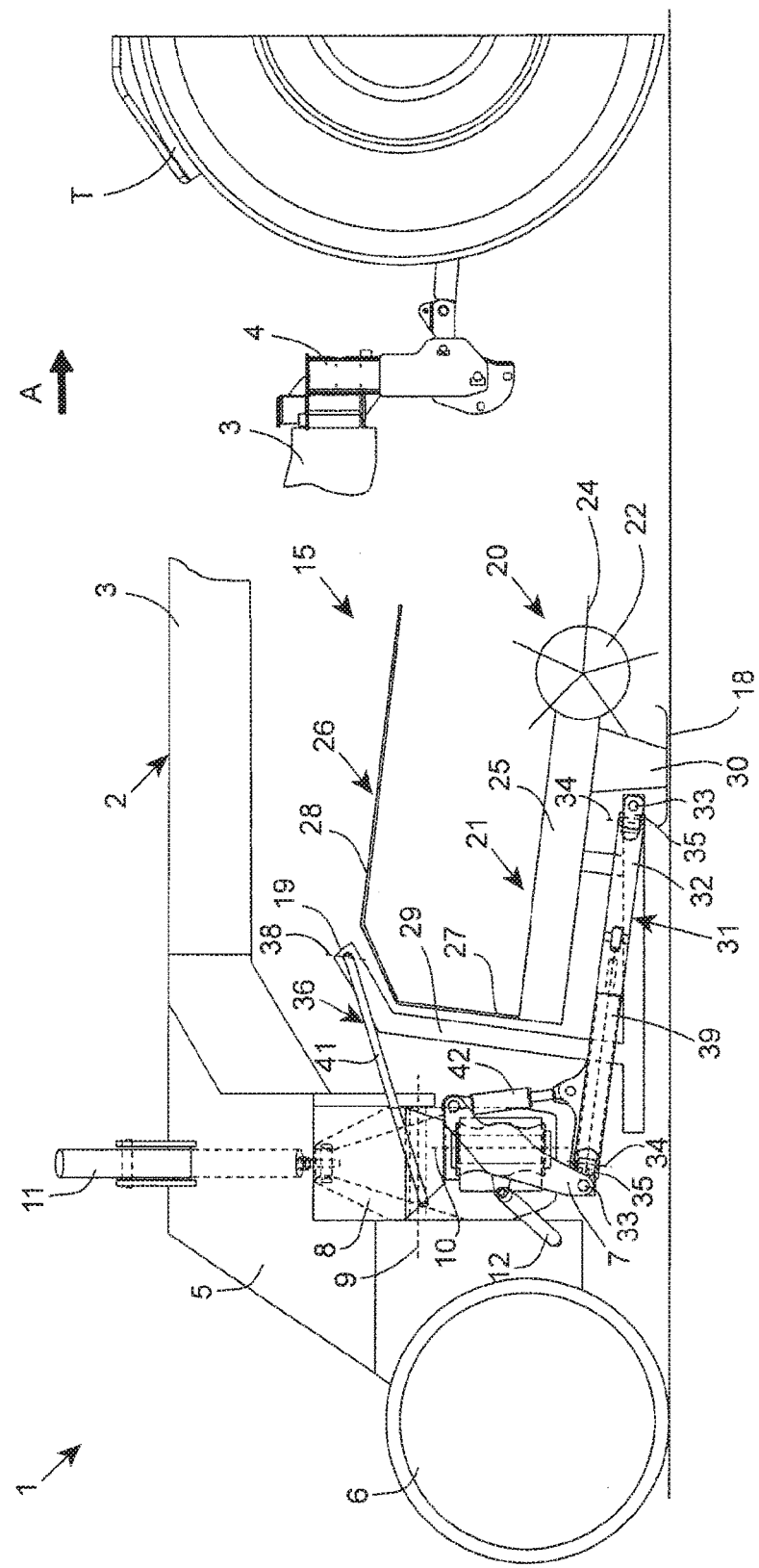
FIG. 5 represents a side view of the embodiment of FIG. 1, hitched to a tractor, comprising some partial sections.
Figure 6:
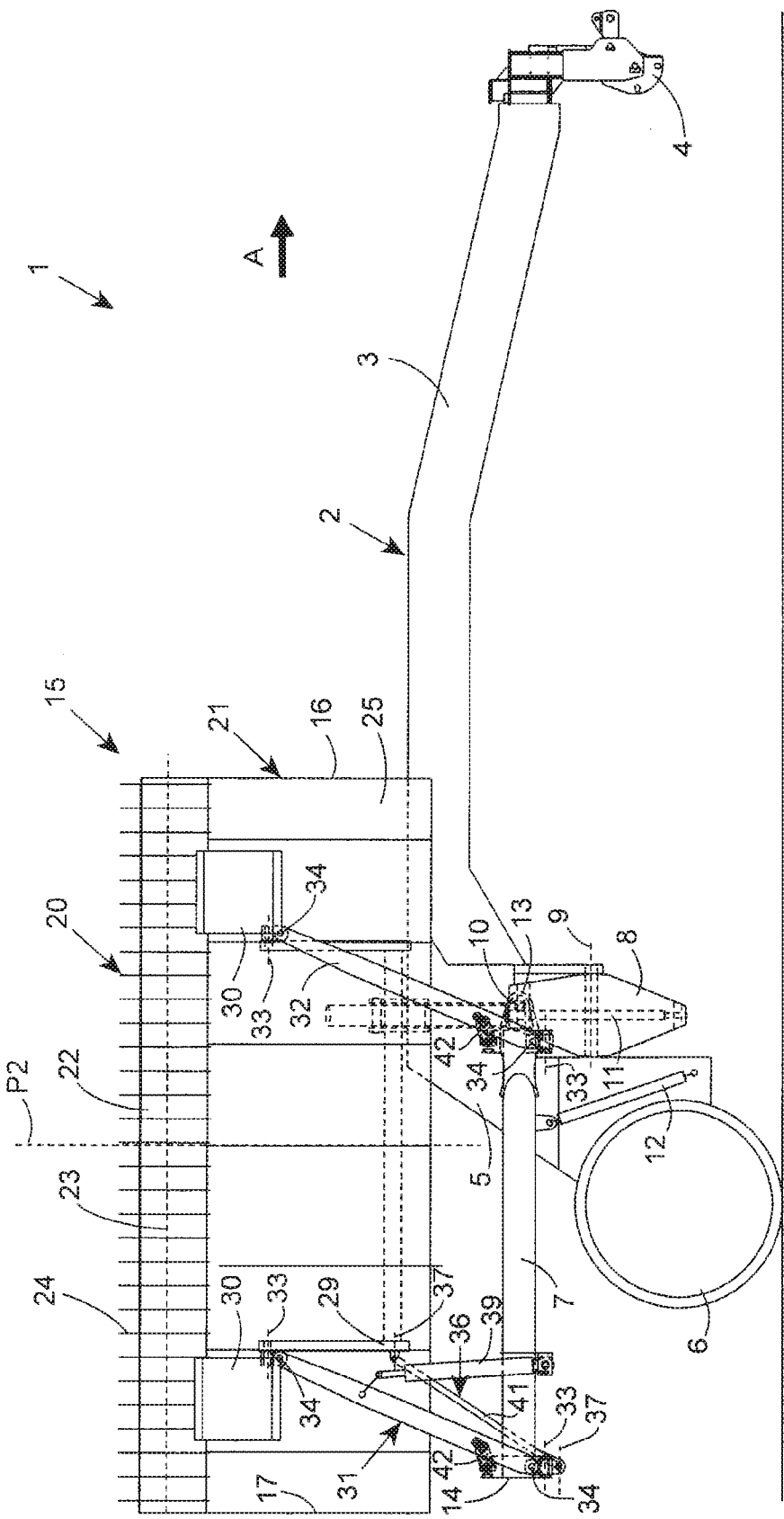
FIG. 6 represents another side view of the embodiment FIG. 1.

The machine 1 according to the invention is an agricultural machine for the harvesting of plants, in particular of fodder. This machine 1 comprises a chassis 2. As can be seen from FIG. 1, this includes a central beam 3 which has at its front end a hitching device 4 for hitching it to a tractor T allowing the machine to be moved in a direction of advance A. In the following description, the terms "front", "rear", "rearwards", "downstream", "behind", "left" and "right" are defined with respect to the direction of advance A, whilst the terms "upwards", "upper", "above", "lower" and "beneath" relate to the ground. The central beam 3 extends along the direction of advance A. In its rear part, the central beam 3 carries lateral posts 5 which extend in the direction of the ground. The chassis 2 is supported on the ground by wheels 6. Each wheel 6 is carried by a respective lateral post 5. At least one support arm 7 is articulated on the chassis 2, which support arm is carried by a lateral post 5. The support arm 7 is connected to this lateral post 5 via an articulation element 8. This articulation element 8 is articulated on the lateral post 5 by means of a first articulation axis 9. This articulation element. 8 is arranged in front of the wheels 6. This first articulation axis 9 extends substantially in the direction of advance A. This first articulation axis 9 is, in addition, substantially horizontal. The support arm 7 is articulated on the articulation element 8 by means of a second articulation axis which is substantially vertical when the machine is working. This second articulation axis 10 is substantially perpendicular to the first articulation axis 9. A third actuator 11 is arranged between the support arm 7 and the chassis 2. This third actuator 11, for example a jack, is articulated on the chassis 2 and on the articulation element. 8 and makes it possible to pivot the latter about the first articulation axis 9. A connecting-rod 12 is, moreover, articulated on the chassis 2 and on the support arm 7. When the third actuator 11 is in shortened position, the second articulation axis 10 is substantially vertical. The support arm 7 then extends in a work configuration in which it extends laterally with respect to the chassis 2. This work configuration of the support arm 7 illustrated in particular in FIGS. 1, 3 and 5. The support arm 7 extends in addition in front of the wheel 6 carried by the lateral post 5 to which the support arm 7 is connected. In particular, the support arm 7 is substantially perpendicular to the direction of advance A. It is, in addition, substantially horizontal. When the third actuator 11 is actuated to lengthening, it pivots the articulation element 8 upwards about the first articulation axis 9. Simultaneously, the support arm 7 pivots about the second articulation axis 10, owing to the connecting-rod 12 which connects it to the chassis 2. The support arm. 7 then pivots, from its work configuration, upwards and towards the rear with respect to the chassis 2. When the third actuator 11 is completely lengthened, the support arm 7 is placed in a transport configuration. This transport configuration of the support arm 7 is illustrated in FIG. 6. In this configuration, the folded support arm 7 occupies a reduced overall dimension along a direction perpendicular to the direction of advance A. This reduced overall dimension is obtained in particular by the fact that the support arm 7 then extends above the wheel 6 carried by the corresponding lateral post 5. In addition, the support arm 7 extends substantially in the direction of advance A. It extends substantially on the horizontal. In the transport configuration, the inner end 13 of the support arm 7 connected to the articulation element 8 is situated in front of the wheel 6. The outer end 14 of the support arm 7 remote from its inner end 13 is placed behind the wheel 6. This folding kinematics of the support arm 7 enables, for transport, both a reduced width of the machine 1 and a good handling due to a reduced wheelbase.

The support arm 7 carries a work tool 15. The latter comprises an inner lateral end 16 and an outer lateral end 17. In the work configuration of the support arm 7, the work tool 15 is delimited laterally, i.e. transversely to the direction of advance A, by the lateral ends 16 and 17. The work tool 15 also comprises a lower vertical end 18 and an upper vertical end 19. In the work configuration of the support arm 7, the work tool 15 is delimited vertically by the vertical ends 18 and 19. In the work configuration of the support arm 7, the work tool 15 can occupy at least a work position in which the work tool acts on plants lying on the ground. In such a work position illustrated in FIG. 5, the work tool 15 extends laterally with respect to the central beam 3 of the chassis 2. The inner lateral end 16 is closer to the central beam 3 than the outer lateral end 17 is. The lower vertical end 18 is close to, or situated substantially at, the level of the ground. In this work position, the work tool 15 extends transversely to the direction of advance A, in particular substantially perpendicularly thereto. The work tool 15 extends, in addition, essentially in a substantially horizontal plane. It extends in front of the support arm 7. The movement of the support arm 7 between its work configuration and its transport configuration leads to moving the work tool 15 between its work position and a transport position. In this transport position represented in FIG. 6, the work tool 15 extends essentially in a plane substantially parallel to the direction of advance A. In particular, the work tool 15 extends substantially on the vertical. It extends above the support arm 7. The inner lateral end 16 of the work tool 15 is placed in front of the corresponding wheel 6, in particular in front of the inner end 13 of the support arm 7. The outer lateral end 17 of the work tool 15 is placed behind this wheel 6, in particular, viewed from a lateral side of the machine 1, substantially at the same level as the outer end 14 of the support arm 7. In the transport position of the work tool 15, its lower vertical end 18 is apparent for a person standing on the side of the machine 1 where this work tool 15 extends. Conversely, the upper vertical end 19 of the work tool 15 is not visible because it faces the central beam 3 of the chassis 2.

The machine 1 according to the embodiment of the figures is a haymaking machine. A haymaking machine is in particular a windrower for plants lying on the ground. A haymaking machine is in particular a machine of the type known under the name of "Merger". In the embodiment of the figures, the work tool 15 comprises a pick-up device 20 for plants lying on the ground and a displacement device 21 placed downstream. In FIGS. 1, 2, 7, 8 and 9, the pick-up device 20 and the displacement device 21 comprise some partial sections, so as to make the other elements of the machine 1 better visible. The pick-up device 20 comprises a rotor 22 able to turn about a rotation axis 23 in anticlockwise direction, viewed from the right of the pick-up device 20. In the work position of the work tool 15, the rotor 22 is driven about this rotation axis 23 which extends transversely to the direction of advance A, in particular substantially perpendicularly thereto, and in particular substantially horizontally. The pick-up device 20 also comprises teeth 24 which pick up the plants at the level the ground, lift them and throw them towards the rear. These teeth 24 comprise teeth points which describe a curved envelope when the teeth 24 are driven. The pick-up device 20 is able to pick up plants gathered together on the ground in windrows, or else spread on the ground in the form of mown, tedded or pre-tedded plants. The pick-up device 20 is, for example, of the type known under the name of "pick-up", the teeth 24 of which are carried by the rotor 22 and emerge from a plurality of blades curved around the rotor 22 and placed beside one another along the rotation axis 23. The teeth 24 move between these blades. The teeth 24 are driven such that they progressively release the plants which approach the displacement device 21. To this end, the pick-up device 20 comprises, for example, a fixed cam track in the interior of which rollers move which are carried by cams connected to the teeth 24. Alternatively, non-driven teeth (24) can also be envisaged. The machine 1 according to the invention can comprise a pick-up device 20 which is carried out differently. The latter can thus comprise a flexible belt wound around, on one hand, a first rotor able to turn about a rotation axis and placed at the front of the pick-up device 20, and on another hand a second rotor placed more to the rear. This second rotor can be placed, in particular, during work, at a greater distance from the ground than the first rotor, so that the pick-up device 20 moves the plants towards the rear and upwards in the direction of the displacement device 21. Such a belt comprises teeth, forks or hooks which can be fixed or articulated on the belt. The driving of the pick-up device 20 is carried out by means of any suitable element. It can be a hydraulic or electric motor, which motor can be housed inside the rotor or else can protrude laterally therefrom. The pick-up device 20 can also be driven by means of a chain or a belt, or else a geartrain. A combination of such means is also possible. The displacement device 21 for the picked up plants is situated at the rear of and close to the pick-up device 20 so that it receives the plants thrown towards the rear by the latter. The displacement device 21 can be driven for moving the plants transversely to the direction of advance A. In the embodiment of the figures, this displacement device 21 comprises a belt conveyor 25. This belt 25 is driven during work such that it moves the plants transversely to the pick-up device 20, in particular substantially parallel to the rotation axis 23 of the rotor 22. The plants are then redeposited on the around in the form of a windrow with a view to their being subsequently taken up. On the rear side of the displacement device 21 a deflector 26 is arranged, illustrated in FIG. 5 and not represented in the other figures for the purposes of clarity. The latter comprises a portion 27 which is substantially vertical during work, to limit the projection of the plants towards the rear. The deflector 26 can also comprise another portion 28 which is substantially horizontal during work, to limit the projections of plants upwards. This other portion 28 is placed in the continuity of the substantially vertical portion 27, above the displacement device 21. The displacement device 21 can also be a roller conveyor, these rollers being for example mounted on rotation axes oriented, during work, substantially in the direction of advance A. Such rollers are preferably placed beside one another and at a slight distance from one another, and can be driven such that the plants are moved transversely to the pick-up device 20. The driving of the displacement device 21, for example of the belt conveyor 25 or of the rollers, is carried out by means of any suitable element. It can be a hydraulic or electric motor. A driving by means of a chain or a belt, or else a geartrain, can also be envisaged. A combination of such means is, of course, possible. These means can be actuated in one operating direction or the other. In particular in the case of a belt conveyor 25 or roller conveyor, the plants can thus be transferred towards the left side or the right side of the work tool 15, for example, to form a windrow on one side or the other. The pick-up device 20, the displacement device 21 and the deflector 26 which the work tool 15 comprises, are supported by a frame 29 of this work tool 15. This frame 29 extends partly beneath the work tool 15 placed in work position, in particular beneath the displacement device 21. The frame 29 also extends partly at the rear of the work tool 15 in work position, in particular at the rear of the displacement device 21. The frame 29 carries at least one support element 30 by means of which the work tool 15 rests on the around. The frame 29 preferably carries at least two support elements 30. The support element 30 is, for example, a skid. This skid extends, for example, beneath the displacement device 21. In particular, two skids can be provided beneath the displacement device 21. The support element 30 can also be a roller. This roller 30 is, for example, placed beneath the displacement device 21, or at a lateral end 16, 17 of the work tool 15. In particular, two rollers 30 can be provided, placed beneath the displacement device 21. Two rollers 30 can also be provided, each placed at a respective lateral end 16, 17 of the work tool 15. This or these support elements 30 lead the work tool 15 to follow the level differences of the ground and allow it to move on the ground, limiting the introduction of earth in the worked plants. The frame 29 of the work tool 15 is connected to the support arm 7 by means of a connecting device 31.

The connecting device 31 is configured so as to enable, at least when the support arm 7 is in the work configuration, a first movement, of the work tool 15 with respect to the support arm 7, during which the inner lateral end 16 and the outer lateral end 17 of the work tool 15 move vertically with respect to the support arm 7 and in the same vertical direction with respect thereto. This first movement is allowed at least during the work of the machine so that the concerned work tool 15 can readily follow the terrain. At least when the support arm 7 is in the work configuration, the lateral ends 16 and 17 are therefore allowed, during their simultaneous respective vertical movements with respect to the support arm 7, to both move away from the ground, or else to both move close to it. The connecting device 31 comprises at least one arm 32 which is visible in particular in FIGS. 1 to 4. In the work configuration of the support arm 7, this arm 32 is oriented essentially in the direction of advance A. "Oriented essentially in the direction of advance A" means that this arm 32, in particular a length of this arm 32, forms an angle comprised between 0° and approximately 45° with the direction advance A. In addition, in the work configuration of the support arm 7, the arm 32 extends, at least for a large part of it, in front of the support arm 7. The arm 32 is articulated on the support arm 7 about a first axis 33. This first axis 33 connects, for example, the arm 32 directly to the support arm 7. The first axis 33 is oriented transversely, in particularly substantially perpendicularly, to the direction of advance A, and substantially horizontally, when the support arm 7 is in the work configuration. The first axis 33 can be a physical axis, i.e. an elongated piece having an essentially cylindrical section, which permits the assembly of the arm 32 on the support arm 7. The first axis 33 can also, or alternatively to a physical axis, be a virtual axis. In this case, the first axis 33 is a straight line about which the rotation of the arm 32 takes place. A first virtual axis 33 exists when, for example, the corresponding articulation of the arm 32 on the support arm 7 is of the ball type. By pivoting about the first axis 33 which connects the arm 32 to the support arm 7, the arm 32 moves vertically with respect to the support arm 7 in the work configuration. In this way, the work tool 15 moves vertically with respect to this support arm 7. This possibility of vertical movement of the work tool 15 by means of the arm 32 and of the first axis 33 allows the work tool 15 to follow a terrain having an irregular profile. It also allows the work tool 15 to occupy the work position previously described, and also at least a position raised from the ground, for example for passing a windrow, in which the work tool 15 does not act on the plants lying on the ground. The vertical movement of the work tool 15 and/or its placement in the raised position, are possible even though the support arm 7 remains in its work configuration, immobile or at least substantially immobile with respect to the chassis 2. The arm 32 is in particular articulated on the support arm 7 and on the frame 29 of the work tool 15 about respective first axes 33. These first axes 33 allow the work tool 15 to move vertically with respect to the support arm 7 and substantially parallel to the ground. These first axes 33 are oriented transversely, in particular substantially perpendicularly, to the direction of advance A, and substantially horizontally, when the support arm 7 is in the work configuration. These first axes 33 are in particular substantially parallel with one another. A first axis 33 can be a physical axis, i.e. an elongated piece having an essentially cylindrical section, which enables the assembly of the arm 32 on the support arm 7 or on the frame 29 of the work tool 15. A first axis 33 can also, or alternatively to a physical axis, be a virtual axis. In this case, the first axis 33 is a straight line about which the rotation of the arm 32 takes place. A first virtual axis 33 exists when, for example, the corresponding articulation of the arm 32 on the support arm 7 or on the frame 29 of the work tool 15 is of the ball type. By pivoting about at least one of these first axes 33, the arm 32 moves vertically with respect to the support arm 7 in the work configuration. In this way, the work tool (15) moves vertically with respect to this support arm 7. During this movement, the arm 32 pivots about the first axis 33 which connects it to the support arm 7, and also about the first axis 33 which connects it to the frame 29 of the work tool 15. One of the first axes 33 connects for example directly the arm 32 to the support arm 7. The other of these first axes 33 connects for example directly the arm 32 to the frame 29 of the work tool 15.

According to the invention, the connecting device 31 comprises means allowing a second movement of the work tool 15 to be operated with respect to the support arm 7. This second movement is transverse to the direction of advance A and substantially horizontal, considering the support arm 7 in the work configuration. This second movement can be operated when the support arm 7 is in the work configuration, or also when the support arm 7 is in an intermediate configuration situated between the work configuration and the transport configuration. "Transverse to the direction of advance A and substantially horizontal, considering the support arm 7 in the work configuration" means that, even operated in the intermediate configuration and not in the work configuration the support arm 7, this second movement would have an orientation which, bringing the support arm 7 in an imaginary manner back into its work configuration, would be transverse to the direction of advance A and substantially horizontal. The intermediate configuration is, for example, a configuration for passing a windrow. The means make it possible to operate this second movement independently of the first vertical movement of the work tool 15 with respect to the support arm 7. Thus, the work tool 15 can readily follow the terrain, whatever the transverse position which it occupies with respect to the chassis 2.

To this end, the means comprise a second axis 34 oriented substantially perpendicularly to the first axis 33. In the work configuration of the support arm. 7, this second axis 34 is oriented substantially vertically. The arm 32 is articulated on the support arm 7 about this second axis 34. The second axis 34 connects, for example, the arm 32 indirectly to the support arm 7, by means of an articulation piece 35 connected to the support arm 7 by means of the first axis 33. The embodiment illustrated in FIG. 2 comprises such an arrangement of the second axis 34. The second axis 34 can be a physical axis. The second axis 34 can be distinct from the first axis 33. The second axis 34 can also cross the first axis 33, in this case the first axis 33 and the second axis 34 form together an articulation cross of the arm. 32 on the support arm 7. The second axis 34 can also, or alternatively to a physical axis, be a virtual axis. A second virtual axis exists when, for example, the corresponding articulation of the arm 32 on the support arm 7 is of the ball type. According to an alternative which is not represented, the second axis 34 can directly connect the arm 32 to the support arm 7. Such an arrangement is obtained for example by means of an articulation cross arranged between the arm 32 and the support arm 7, which articulation cross integrates the first axis 33 and the second axis 34. Another arrangement allowing the arm 32 to be connected directly to the support arm 7 comprises an articulation ball between the two abovementioned elements, which ball integrates the first axis 33 and the second axis 34 which are then virtual. Owing to the connection of the arm 32 to the support arm 7 by means of the first axis 33 and of the second axis 34, the connecting device 31 groups together the functions of vertical movement and transverse movement of the work tool 15 with respect to the support arm 7. The following of the terrain, the movement, between the work position and a raised position of the work tool above the ground, and also the adjustment of its transverse position with respect to the chassis 2 can thus be ensured by the sole connecting device 31, in particular by the sole movements of the arm 32 with respect to the support arm 7 in the vertical and transverse directions. The arrangement of the support arm 7 and also its means articulation and movement with respect to the chassis 2 can be simplified and made lighter, in particular, it can be superfluous to have recourse to an arm 32 in several articulated and/or sliding sections with a view to moving the work tool 15 transversely with respect to the chassis 2. The means comprise in particular second axes 34 oriented substantially perpendicularly to the first axis 33. In the work configuration of the support arm 7, these second axes 34 are oriented substantially vertically. These second axes 34 are in particular substantially parallel with respect to one another. These second axes 34 allow the work tool 15 to keep, in top view of the machine 1, the same orientation with respect to the direction of advance A, in particular to extend substantially perpendicularly to the direction of advance A, whatever the transverse position of the work tool 15 with respect to the support arm. 7 in work configuration. This effect can be seen from a comparison of FIGS. 3 and 4. The arm 32 is articulated on the support arm 7 and on the frame 29 of the work tool 15 about these respective second axes 34. One of these second axes 34 connects, for example, indirectly the arm 34 to the support arm 7 by means of the articulation piece connected to the support arm 7 by means of the corresponding first axis 33. The other of these second axes 34 connects, for example, indirectly the arm 32 to the frame 29 of the work tool 15, by means of another articulation piece 35 connected to this frame 29 by means of the corresponding first axis 33. A second axis 34 can be a physical axis, i.e. an elongated piece having an essentially cylindrical section, which enables the assembly of the arm 32 on the support arm 7 or on the frame 29 of the work tool 15. A second axis 34 can be distinct from the corresponding first axis 33. A second axis 34 can also cross the corresponding first axis 33, in this case the first axis 33 and the second axis 34 form together an articulation cross of the arm 32 on the support arm 7 or on the frame 29 of the work tool 15. A second axis 34 can also, or alternatively to a physical axis, be a virtual axis. In this case, the second axis 34 is a straight line about which the rotation of the arm 32 takes place. A second virtual axis 34 exists when, for example, the corresponding articulation of the arm 32 on the support arm 7 or on the frame 29 of the work tool 15 is of the ball type. According to an alternative which is not represented, one and/or the other of the respective second articulation axes 34 on the support arm 7 and on the frame 29 of the work tool 15 can directly connect the arm 32 to the support arm 7, respectively to the frame 29. Such an arrangement is obtained for example by means of an articulation cross arranged between the arm 32 and the support arm 7, respectively between the arm 32 and the frame 29, which articulation cross integrates the concerned first and second axes 33 and 34. Another arrangement making it possible for the arm 32 to be connected directly to the support arm 7, respectively to the frame 29, comprises an articulation ball between the arm 32 and the support arm 7, respectively between the arm 32 and the frame 29, which ball integrates the concerned first and second axes 33 and 34 which are then virtual.

The connecting device 31 comprises a connecting element 36. In the work configuration of the support arm 7, the connecting element 36 extends, at least for a large part of it, in front of the support arm 7. The connecting element 36 is oriented essentially in the direction of advance A when the support arm 7 is in the work configuration. "Oriented essentially in the direction of advance A" means that the connecting element 36 forms an angle comprised between 0° and approximately 45° with the direction of advance A. The connecting element 36 is articulated on the support arm 7 about a first connecting axis 37. This first, connecting axis 37 connects, for example, the connecting element 36 directly to the support arm 7. The first connecting axis 37 is oriented, when the support arm 7 is in the work configuration, substantially horizontally and transversely, in particular substantially perpendicularly, to the direction of advance A. The first connecting axis 37 is substantially parallel to the first axis 33 of the arm 32. Following the example of the first axis 33, the first connecting axis 37 can be a physical axis. The first connecting axis 37 can also, or alternatively to a physical axis, be a virtual axis. In this case, the first connecting axis 37 is a straight line about which the rotation of the connecting element 36 takes place. A first virtual connecting axis 37 exists when, for example, the corresponding articulation of the connecting element 36 on the support arm 7 is of the ball type. By pivoting about the first connecting axis 37, the connecting element 36 moves vertically with respect to the support arm 7 in the work configuration. The arm 32 is remote and not connected to the connecting element 36.

The connecting element 36 is articulated in particular on the support arm 7 and on the work tool 15 about respective first connecting axes 37. One of these first connecting axes 37 connects, for example, the connecting element 36 directly to the support arm 7. The other of these first connecting axes 37 connects, for example, the connecting element 36 directly to the frame 29 of the work tool 15. These first connecting axes 37 are oriented, when the support arm 7 is in the work configuration, substantially horizontally and transversely, in particular substantially perpendicularly, to the direction of advance A. These first connecting axes 37 are in particular substantially parallel with respect to one another. These first connecting axes 37 are in particular substantially parallel to the first axis 33 of the arm 32. A first connecting axis 37 can be a physical axis. A first connecting axis 37 can also, or alternatively to a physical axis, be a virtual axis. In this case, the first connecting axis 37 is a straight line about which the rotation of the connecting element 36 takes place. A first virtual connecting axis 37 exists when, for example, the corresponding articulation of the connecting element 36 on the support arm 7 or on the frame 29 of the work tool 15 is of the ball type. By pivoting about at least one of the first connecting axes 37, the connecting element 36 moves vertically with respect to the support arm 7 in the work configuration. In particular, during this movement, the connecting element 36 pivots about the first connecting axis 37 which connects it to the support arm 7. During this movement, the connecting element 36 also pivots about the first connecting axis 37 which connects it to the frame 29 of the work tool 15.

In the embodiment of the figures, the connecting device 31 comprises two arms 32. These are remote from one another and not connected to one another. Each of these arms 32 is articulated on one hand on the support arm 7 by means of a first axis 33 and a second axis 34, on another hand on the frame 29 of the work tool 15 also by means of a first axis 33 and a second axis 34. Each arm 32 is remote from the connecting element 36 and not connected thereto.

The means comprise a second connecting axis 38 oriented substantially perpendicularly to the first connecting axis 37. In the work configuration of the support arm 7, this second connecting axis 38 is oriented substantially vertically. The connecting element 36 is articulated on the support arm 7 about this second connecting axis 38. The second connecting axis 38 can be a physical axis. The second connecting axis 38 can be distinct from the first connecting axis 37. The second connecting axis 38 can also cross the first connecting axis 37, in this case the first connecting axis 37 and the second connecting axis 38 form together an articulation cross of the connecting element 36 on the support arm 7. The second connecting axis 38 can also, or alternatively to a physical axis, be a virtual axis. A second virtual connecting axis 38 exists when, for example, the corresponding articulation of the connecting element 36 on the support arm 7 is of the ball type.

The means comprise in particular second connecting axes 38 oriented substantially perpendicularly to the first connecting axis 37, in the work configuration of the support arm 7, these second connecting axes 38 are oriented substantially vertically. The connecting element 36 is articulated on the support arm 7 and on the frame 29 of the work tool 15 about these respective second connecting axes 38. A second connecting axis 38 can be a physical axis. A second connecting axis 38 can be distinct from the corresponding first connecting axis 37. A second connecting axis 38 can also cross the first corresponding connecting axis 27, in this case the first connecting axis 37 and the second connecting axis 38 form together an articulation cross of the connecting element 36 on the support arm 7 or on the frame 29 of the work tool 15. A second connecting axis 38 can also, or alternatively to a physical axis, be a virtual axis. A second virtual connecting axis 38 exists when, for example, the corresponding articulation of the connecting element 36 on the support arm 7 or on the work tool 15 is of the ball type.

According to an advantageous feature of the invention, an arm 32 extends towards the front from the support arm 7 in the work configuration, in the direction of the lower part of the frame 29. In particular, the first axis 33, connecting this arm 32 to the frame 29 of the work tool 15, is situated beneath the displacement device 21. A large part of the weight of the work tool 15 is thus taken up by the arm 32. The first axis 33, connecting the arm 32 to the frame 29 of the work tool 15, is in particular arranged substantially plumb with a straight line parallel to the rotation axis 23 of the pick-up device 20 and passing through the center of gravity of the work tool 15. In this way, this arm 32 carries the work tool 15 in a balanced manner, the tendency of the work tool 15 to want to pivot about the first axis 33, connecting the arm 32 to the frame 29, is reduced. In the embodiment of the figures, the two arms 32 extend towards the front from the support arm 7 in the work configuration, in the direction of the lower part of the frame 29. In particular, the first axes 33 connecting these arms 32 to the frame 29 of the work tool 15, are situated beneath the displacement device 21. These first axes 33 connecting the arms 32 to the frame 29 of the work tool 15 are in particular arranged substantially plumb with a straight line parallel to the rotation axis 23 of the pick-up device 20 and passing through the center of gravity of the work tool 15. In this way, the work tool is almost in balance on the arms 32 which carry it, and the forces in the connecting element 36—stresses in traction or in compression—are very reduced.

The means comprise a first actuator 39 which makes it possible to move the work tool 15 with respect to the support arm 7, transversely to the direction of advance A. This first actuator 39 is, for example, a hydraulic jack. The first actuator 39 connects two elements from amongst the support arm 7, the connecting device 31 and the frame 29 of the work tool 15. By being connected for example to the connecting device 31, the first actuator 39 is connected to one of the arms 32 or to the connecting element 36. In the embodiment of the figures, the first actuator 39 is arranged, in particular articulated, between the support arm 7 and one of the arms 32. It extends in a non-parallel manner to this arm 32. Thus, when the first actuator 39 is driven to shortening or to lengthening, it pivots the arm 32 about the second axis 34 which connects it to the support arm 7. Of course, the first actuator 39 could also be articulated between the support arm 7 and the frame 29 of the work tool 15, by extending in a non-parallel manner to the arms 32. The first actuator 39 makes it possible to move the work tool 15 between a first transverse position with respect to the support arm 7 and a second transverse position with respect to the support arm 7. In the first transverse position illustrated in FIG. 3, the inner lateral end 16 of the work tool 15 is brought closer to a first median vertical plane P1 of the chassis 2. This first plane P1 is oriented in the direction of advance A. It passes through the longitudinal axis of the central beam 3 of the chassis 2. In the first transverse position represented in FIG. 3, the inner lateral end 16 of the work tool 15 is situated between the first plane P1 and the wheel 6, situated, with respect to the central beam 3, on the same side as the work tool 15. The work tool 15 can occupy a first work position obtained by the positioning of the support arm 7 in the work configuration, and by the positioning of the work tool 15 in the first transverse position with respect to the support arm 7. In this first work position, the inner lateral end 16 of the work tool 15 is situated substantially in the first median vertical plane P1 of the chassis 2. It will be noted in particular in FIG. 3 that this inner lateral end 16 is then situated beneath the central beam 3 of the chassis 2. In the second transverse position of the work tool 15 with respect to the support arm 7, illustrated in FIG. 4, the inner lateral end 16 of the work tool 15 is distanced from the first median vertical plane P1 of the chassis 2. The work tool can occupy a second work position obtained by the positioning of the support arm 7 in the work configuration and by the positioning of the work tool 15 in the second transverse position with respect to the support arm 7. In this second work position, the inner lateral end 16 of the work tool 15 is in particular situated substantially at the level of the inner side 40 of the tyre of the wheel 6 situated, with respect to the central beam 3, on the same side as the work tool 15, or slightly away from this inner side 40. In this way, the distance separating the inner lateral end 16 from the first plane P1 is equal to, or slightly less than, half the distance separating the respective inner sides 40 of the tyres the wheels 6. The support arm 7 being in the work configuration, two vertical planes each passing through a length of a respective arm 32, are substantially parallel with one another. In addition, the two arms 32 have substantially the same length. In this way, the movement of the work tool 15 between the first transverse position and the second transverse position is substantially parallel to a length of the support arm 7.

According to an advantageous feature of the invention, the work tool 15 comprises a second median vertical plane P2 situated equidistant from the inner and outer lateral ends 16 and 17, an arm 32 is situated between the inner lateral end 16 and the second median vertical plane P2, and the other arm 32 is situated between the second median vertical plane P2 and the outer lateral end 17. In this way, the frame 29 of the work tool 15 is held securely with respect to the support arm 7 in the work configuration. This arrangement of the arms 32 considerably reduces the tendency of the work tool 15 to want to pivot about a vertical axis when, during work, the forces exerted on the work tool 15 by the terrain and by the worked plants, are not distributed uniformly between the inner lateral end 16 and the outer lateral end 17 of the work tool 15. It is in particular the case when the density of the worked plants, in particular picked up, is not homogeneous, or else when a windrow picked up by the work tool 15 is not centred with respect thereto. Furthermore, an arm 32 is placed substantially at the level of the inner end 13 of the support arm 7. This is the arm 32 situated between the inner lateral end 16 of the work tool 15 and the second median vertical plane P2. An arm 32 is placed substantially at the level the outer end 14 of the support arm 7. This is the arm 32 situated between the second median vertical plane P2 and the outer lateral end 17.

The connecting element 36 comprises a rod 41. In particular, the connecting element 36 is constituted by a rod 41. In the work configuration of the support arm 7, this rod 41 is oriented essentially in the direction of advance A. "Oriented essentially in the direction of advance A" means that this rod 41 forms an angle comprised between 0° and approximately 45° with the direction of advance A. The rod 41 is articulated on the support arm 7 and on the frame 29 of the work tool 15 by means of the first and second connecting axes 37 and 38. In particular, the rod 41 is articulated directly on the support arm 7 by means of at least one of the concerned first and second connecting axes 37 and 38, and directly on the frame 29 of the work tool 15 by means of at least one of the other concerned first and second connecting axes 37 and 38. The rod 41 is of fixed or variable length. A rod 41 of variable length comprises, for example, screwed elements with a left-hand thread and a right-hand thread. It can also be composed of elements able to slide one into the other and to be immobilised one with respect to the other by means of a pin able to engage in several adjustment holes. Finally, such a rod 41 of variable length can take the form of a jack, in particular a hydraulic jack.

The connecting element 36 and at least one of the arms 32 are situated in respective planes which are vertically distant from one another when the support arm 7 is in the work configuration. As can be seen from FIG. 5, the connecting element 36 extends in a plane which, when the support arm 7 is in the work configuration, is vertically more remote from the ground than that in which an arm 32, in particular each arm 32, extends. When the support arm 7 is in the work configuration, an arm 32, in particular each arm 32, extends, at least over a portion of its length, beneath the displacement device 21. The connecting element 36 itself extends, at least over a portion of its length, from the support arm 7 in the direction of the upper vertical end 19 of the work tool 15, for example, in the direction of an upper part of the deflector 26, placed at the rear of the displacement device 21.

Figure 7:
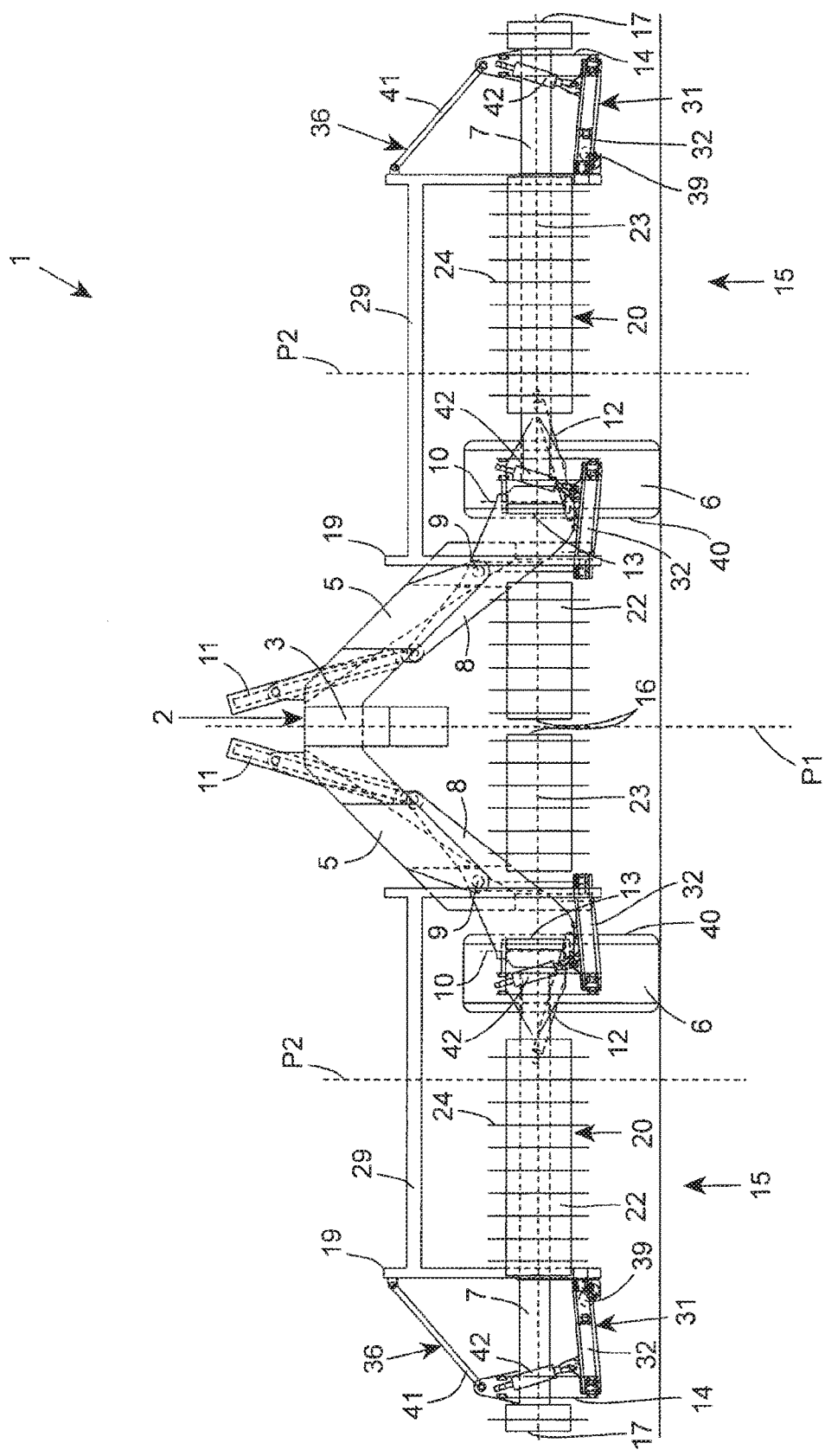

The machine 1 according to the invention comprises at least a second actuator 42. The latter connects two elements from among the support arm 7, the connecting device 31 and the frame 29 of the work tool 15. In the embodiment of the figures, the second actuator 42 is articulated between the support arm 7 and an arm 32. The second actuator 42 is, for example, a jack, in particular a hydraulic jack. The second actuator 42 allows a movement of the work tool 15 to be operated with respect to the support arm 7 towards at least one raised position of the work tool 15 with respect to the support arm 7, in which the work tool 15 is distant from the ground. This raised position is illustrated in FIG. 7. In particular, two second actuators 42 are provided for the work tool 15. Each is articulated on the support arm 7 and on a respective arm 32. The movement towards the raised position is operated by the two second actuators 42 which are, for example, actuated simultaneously. In the raised position with respect to the support arm 7, the work tool 15 does not act on the plants lying on the ground. This raised position is situated between the work position and the transport position of the work tool 15. The movement of the work tool 15 with respect to the support arm 7, by means of the second actuator 42, towards the raised position of the work tool 15 with respect to the support arm 7, in particular from the work position of the work tool 15 towards the raised position of the work tool 15 with respect to the support arm 7, comprises a vertical component. This movement can be operated while the support arm 7 is in the work configuration. This movement, is essentially vertical. In addition, the work tool 15 remains substantially parallel to the ground during this movement. In the work configuration of the support arm 7 and in the raised position of the work tool 15 with respect to the support arm 7, the work tool 15 extends substantially perpendicularly to the direction of advance A. In the work configuration of the support arm 7 and in the raised position of the work tool with respect to the support arm 7, the inner and outer lateral ends 16 and 17 of the work tool 15 are situated substantially at the same height above the ground. In particular, the support arm 7 in the work configuration remains immobile, or substantially immobile, with respect to the chassis 2. The obtained raised position, while the support arm 7 is in the work configuration, is, for example, a windrow passing position of the work tool 15, enabling in particular the passage above a windrow of small height formed previously by a harvesting machine adjusted in wide spreading mode. In this raised position of the work tool 15 with respect to the support arm 7 in the work configuration, the vertical clearance of the work tool 15 above the ground is considerable, comprised between 200 mm and 400 mm for example, close to 300 mm for example.

According to an advantageous feature of the invention, a raised position is a first raised position. This first raised position which the work tool 15 can occupy with respect to the support arm 7, is obtained by the transverse positioning of the work tool 15 in the first transverse position with respect to the support arm 7. The raised position illustrated in FIG. 7 is in this case such a first raised position. From the first work position of the work tool 15, the actuation of the second actuator(s) 42 has the effect of raising the work tool 15 such that the latter is moved towards the first raised position with respect to the support arm 7.

According to another advantageous feature of the invention, another raised position is a second raised position. This second raised position which the work tool 15 can occupy with respect to the support arm 7, is obtained by the transverse positioning of the work tool 15 in the second transverse position with respect to the support arm 7. From the second work position of the work tool 15, the actuation of the second actuator(s) 42 has the effect of raising the work tool 15 such that the latter is moved towards the second raised position with respect to the support arm 7.

The work tool 15 can occupy in particular the first and second raised positions with respect to the support arm 7, namely sometimes one, sometimes the other, according to the requirements, when the support arm 7 is in the work configuration. It is likewise possible to move the work tool 15 from the first raised position towards the second raised position, and vice versa, by actuation of the first actuator 39, while the support arm 7 is in the work configuration. Thus, from the first raised first position illustrated in FIG. 7, the work tool 15 can be distanced from the central beam 3 of the chassis 2 to reach its second raised position, the support arm 7 remaining, during this movement, in its work configuration.

The third actuator 11 arranged between the support arm 7 and the chassis 2 makes it possible to operate a movement of the support arm 7, with respect to the chassis 2, towards the intermediate configuration with respect to the chassis 2, which is situated between the work configuration and the transport configuration. In this intermediate configuration, the outer end 14 of the support arm 7 is situated at a greater height above the ground than its inner end 13. In addition, the outer end 14 is placed rearwards with respect to the inner end 13. The support arm 7 therefore has an oblique orientation which is intermediate between its substantially horizontal and transverse orientation in the work configuration, and its orientation which is substantially horizontal and substantially parallel to the direction of advance A in the transport configuration. In this intermediate configuration of the support arm 7 with respect to the chassis 2, the work tool 15 extends in an oblique manner with respect to a vertical plane perpendicular to the direction of advance A.

The work tool 15 can occupy the raised position(s) with respect to the support arm 7 when the latter is in the intermediate configuration. In this case, the work tool 15 is distant from the ground. It does not act on the plants present on the ground. FIG. 8 shows that the work tool 15 can occupy the second raised position, with respect to the support arm 7, when the latter is in the intermediate configuration. For its part, FIG. 9 shows that the work tool 15 can occupy the first raised position, with respect to the support arm 7, when the latter is in the intermediate configuration. In particular, when the support arm 7 is in the intermediate configuration, the first actuator 39 can be actuated so as to move the work tool 15 with respect to the support arm 7 of the second transverse position—see FIG. 8—towards the first transverse position—see FIG. 9. In this way, the inner lateral end 16 of the work tool 15 is brought closer to the central beam 3 of the chassis 2. Thus, when the support arm 7 is situated subsequently in its transport configuration, the arm 32, in particular each arm 32, connecting the frame 29 of the work tool 15 to the support arm 7, is oriented upwards and towards the front. In this way, the work tool 15 has an advanced positioning with respect to the support arm 7. The total length of the machine 1 during transport is reduced.

When the work tool 15 is in a raised position, in particular in each of the first and second raised positions, with respect to the support arm 7 in the intermediate configuration, the outer lateral end 17 of the work tool 15 is situated at a greater height above the ground than its inner lateral end 16. In addition, the outer lateral end 17 of the work tool 15 is situated more to the rear than the inner lateral end 16. Thus, in a raised position, in particular in each of the first and second raised positions, with respect to the support arm 7 in the intermediate configuration, the work tool 15 extends in an oblique manner with respect to a vertical plane perpendicular to the direction of advance A. Furthermore, the inner lateral end 16 of the work tool 15 is situated at a greater height above the ground in the intermediate configuration of the support arm 7 than in the work configuration of the support arm 7 with respect to the chassis 2, in particular when the work tool 15 occupies the first transverse position with respect to the support arm 7.

The intermediate configuration of the support arm 7 is, for example, a configuration for passing a windrow. A raised position of the work tool 15 with respect to the support arm 7 in the intermediate configuration is, for example, a windrow passing position for the work tool 15, enabling in particular the passage above a compacted windrow of considerable height. In this raised position, the vertical clearance of the work tool 15 above the ground is completely considerable. The inner lateral end 16 is raised at a height from the ground comprised between 500 mm and 1000 mm for example, while the outer lateral end 17 is situated at a distance from the ground comprised between 800 mm and 1300 mm for example.

The second actuator 42 comprises a means for lightening the work tool on the ground. To this end, the second actuator 42 comprises, for example, a jack which ensures the functions at the same time of raising and of lightening the work tool 15 with respect to the support arm 7. For the lightening, this jack is, for example, connected to a pressure accumulator. During work, the support arm 7 in work configuration remains immobile, or substantially immobile, with respect to the chassis 2. It is the second actuator 42 placed in "floating" mode which enables the vertical movements of the work tool 15 with respect to the chassis 2, these movements being to a certain extent controlled and damped. Each second actuator 42 articulated on the support arm 7 and on a respective arm 32 comprises such a lightening means. In addition, the respective articulations of each arm 32 on the frame 29 of the work tool and on the support arm 7 are configured to enable a pivoting of the work tool 15, with respect to the support arm in the work configuration, about a virtual axis oriented substantially in the direction of advance A. Owing to this lightening means and these articulations associated with each arm 32, the arms 32 can, during work, move vertically with respect to the support arm 7 independently of one another. Thus, when the work tool 15 progresses over an irregular terrain, its inner and outer lateral ends 16 and 17 can move vertically in different directions and/or with different amplitudes. In addition, given the location of each arm 32 between the second median vertical plane P2 and the corresponding lateral end 16, 17, each arm 32 takes up substantially the same fraction of the vertical forces exerted on these arms 32 by the work tool. The lightening of the work tool 15 is balanced between the two arms 32. The lightening of the work tool 15 over its working width is uniform.

Figure 1:
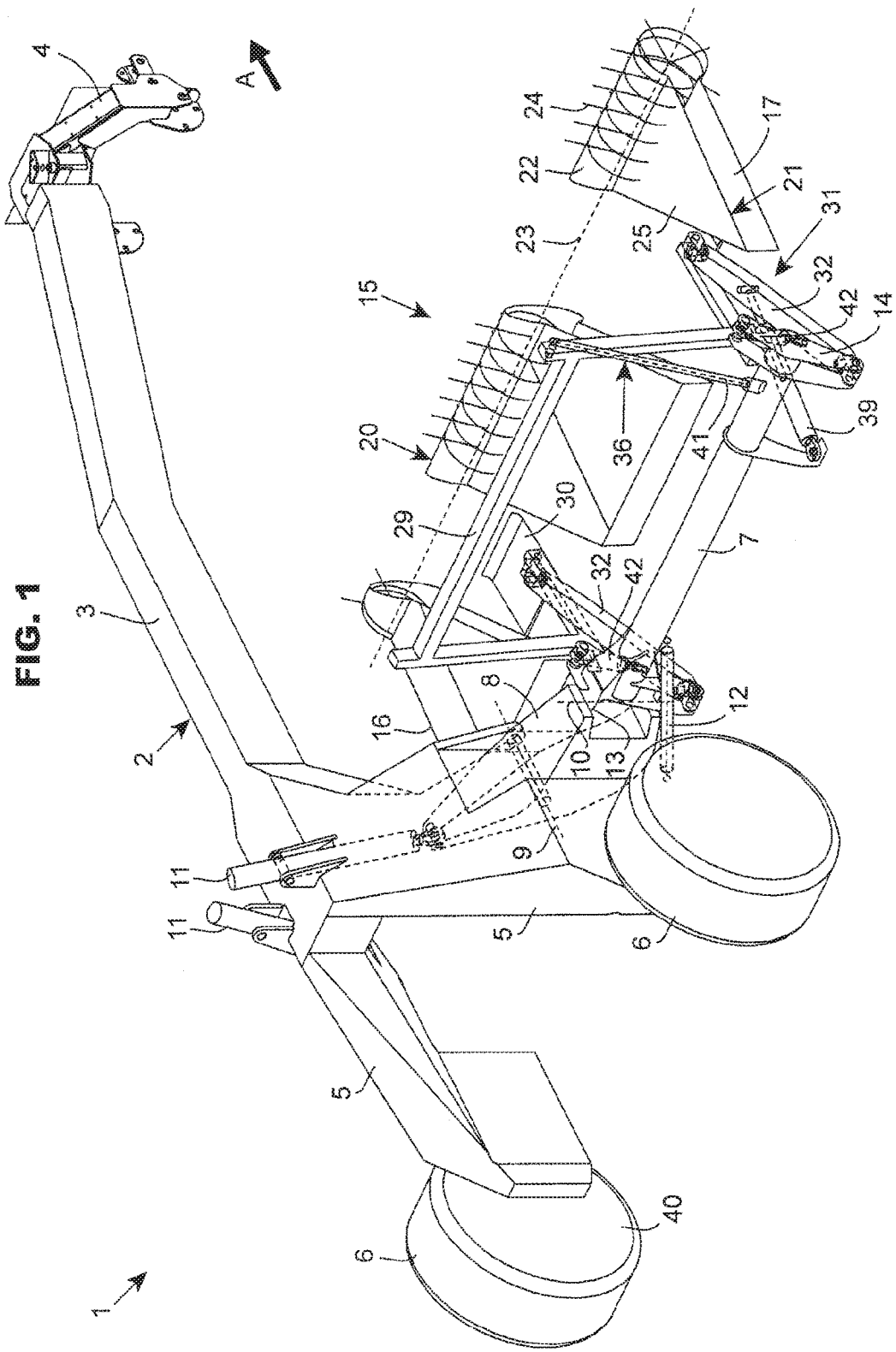
FIG. 1 represents a partial view, in perspective, of an embodiment of a machine according to the invention, comprising some partial sections.
Figure 2:
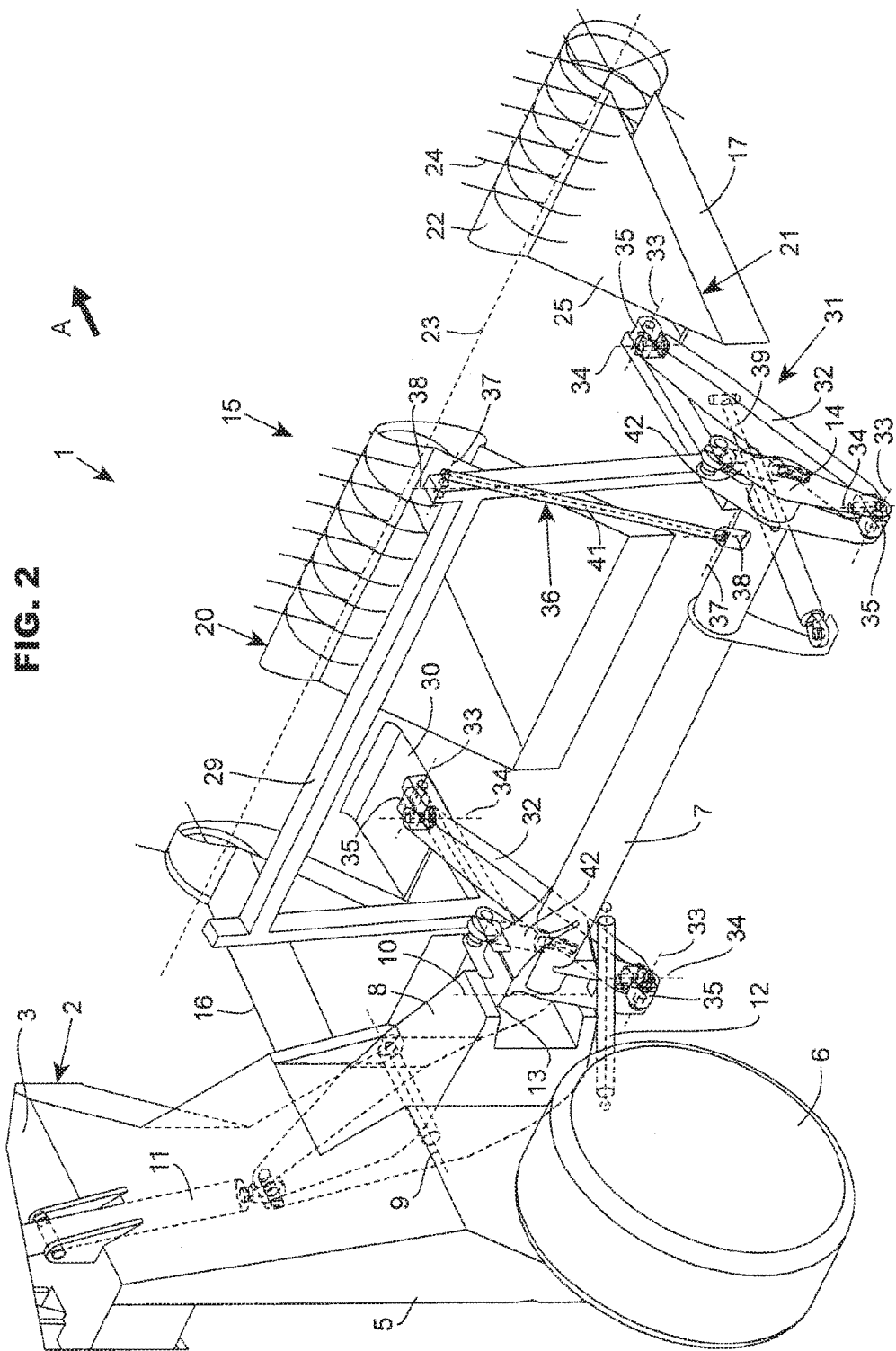
FIG. 2 is an enlargement of the view of FIG. 1.

The embodiment of the figures comprises two work tools 15 each articulated on the chassis 2 by means of a respective support arm 7 situated on a respective side of the chassis 2. FIGS. 1 and 2 represent a single work tool 15, arranged on the right side of the machine 1, the second work tool 15 is placed on the left side of the machine 1.

Each work tool 15 comprises a frame 29 connected to the corresponding support arm 7 by means of a respective connecting device 31. By actuation of at least one, in particular of each, first actuator 39 associated with the corresponding work tool 15, it is possible to adjust the total working width of the machine 1. The first actuator 39 associated with a work tool 15 can be actuated when the support arm 7 is in the work configuration or in the intermediate configuration. The respective pick-up devices 20 and displacement devices 21 are then more or less distanced from one another, which makes it possible to vary the width of a central windrow obtained from plants picked up by each pick-up device 20 and moved by each displacement device 21 turning in the direction of the central beam 3 of the chassis 2. When each support arm 7 is in its respective work configuration and when at least one of the work tools 15 is in the second transverse position with respect to the corresponding support arm 7, therefore when this work tool 15 is in its second work position, the inner lateral ends 16 of these work tools 15 are distinctly spaced from one another perpendicularly to the direction of advance A. In particular, each work tool 15 can be in the second transverse position with respect to the support arm. 7 in the work configuration, i.e. each work tool is then in its second work position. The distance, separating the respective inner lateral ends 16, enables the formation of a central windrow deposited between the two work tools 15, from, for example, lateral windrows taken up by each respective work tool 15. When each support arm 7 is in its respective work configuration and each work tool 15 is in the first transverse position with respect to the corresponding support arm 7, i.e. when each work tool is in its respective first work position, the inner lateral ends 16 of these work tools 15 are juxtaposed. This arrangement of the work tools 15 enables the formation of a windrow deposited on the left or right side of the machine 1, from, for example, a continuous picked up width of plants, for example, of mown or tedded plants spread on the ground.

A transposition of the machine from a work situation to a transport situation comprises for example the steps detailed below. The work tool 15 carried by the support arm 7 in the work configuration is firstly raised from the ground by actuation of the second actuator(s) 42. This vertical movement is operated keeping the transverse position of the work tool 15 with respect to the support arm 7. Then the support arm 7 is moved from its work configuration towards its intermediate configuration. If the work tool 15 is, with respect to the support arm 7, in a transverse position other than the first transverse position, it is then moved by actuation of the first actuator 39, which a view to reaching this first transverse position. Finally, the support arm 7 is folded upwards and towards the rear until reaching its transport configuration.

An agricultural machine 1 for the harvesting of plants according to the invention can be a mower. On such a machine, a work tool is configured for carrying out mowing operations. Such a work tool comprises, for example, a mowing device comprising a bar, along which discs or drums provided with knives extend. This mowing device can be followed by a processing device with fingers, flails or rollers, and/or a windrowing device comprising one or more deflectors, or else a belt or rollers, for moving the mown plants transversely to the direction of advance. Such a machine comprises, for example, two such work tools each placed on a respective side of the chassis.

An agricultural machine 1 for the harvesting of plants according to the invention can be a mounted machine, in particular a machine mounted at the rear of a tractor. On such a machine, the chassis comprises a central part having a hitching device designed to hitch it to the three-point hitching device of a tractor.

Of course, the invention is not limited to the embodiment described and represented in the attached figures. Modifications remain possible, in particular from the point of view of the constitution, the arrangement or the number of the various elements, by different combination of the above-mentioned features, or by substitution of technical equivalents without, however, departing from the scope of protection of the invention.

What is claimed as new and desired to be secured by Letters Patent of the United States is:

1. An agricultural machine for the harvesting of plants, said machine being movable in a direction of advance and comprising:
    a chassis;
    at least two support arms, each articulated on the chassis and movable with respect to the chassis between a work configuration in which the support arm extends laterally with respect to the chassis, and a transport configuration in which the support arm is folded such that the overall dimension of the agricultural machine is reduced considering the direction of advance; and
    at least two work tools for processing crop, each work tool being articulated on the chassis by a corresponding support arm situated on a respective side of the chassis, each work tool including an inner lateral end, and being able to occupy a work position in which the work tool acts on plants lying on the ground,
    wherein each work tool farther includes a frame which is connected through a respective connecting device to the corresponding support arm, said connecting device allowing, at least when the support arm is in the work configuration, a first movement of the respective work tool with respect to the support arm in a vertical direction, this connecting device allowing a second movement of the work tool to be operated with respect to the support arm when the support arm is in the work configuration, the second movement enabling to move the inner lateral end of the work tool towards or away from the inner lateral end of the other work tool, and the second movement configured to be allowed to be operated independently of the first movement,
    wherein the connecting device includes at least one arm articulated on one hand on the corresponding support arm through an articulation with a first axis oriented horizontal and transversal to the direction of advance and a vertically oriented second axis, and on the other hand on the frame of the work tool through an articulation with a first axis oriented horizontal and transversal to the direction of advance and a vertically oriented second axis, and
    wherein the connecting device further includes a first actuator for operating the second movement.

2. The machine according to claim 1, wherein the arm is oriented at an angle between 0° and 45° with respect to the direction of advance when the support arm is in the work configuration.

3. The machine according to claim 1, wherein at least a portion of the arm extends in front of the support arm.

4. The machine according to claim 1, wherein the connecting device includes two arms distant from one another.

5. The machine according to claim 1, wherein the connecting device includes a rod articulated on the support arm about a first connecting axis oriented transversely to the direction of advance and substantially horizontally when the support arm is in the work configuration, and the rod is configured to, by pivoting about this first connecting axis, move vertically with respect to the support arm in the work configuration.

6. The machine according to claim 1, wherein the first actuator connects two elements from a group consisting of the arm, the connecting device, and the frame of the work tool.

7. The machine according to claim 1, wherein a second actuator connects two elements from a group consisting of the support arm, the connecting device, and the frame of the work tool, the second actuator configured to operate the first movement of the respective work tool.

8. The machine according to claim 7, wherein the work tool extends, in its work position, in a substantially horizontal plane, the work tool is movable between this work position and a transport position, in which the work tool extends in a plane substantially parallel to the direction of advance, and wherein a third actuator arranged between the support arm and the chassis is configured to operate a movement of the support arm, with respect to the chassis, towards an intermediate configuration with respect to the chassis, situated between the work configuration and the transport configuration.

9. The machine according to claim 8, wherein in the intermediate configuration of the support arm, an outer end of the support arm is situated at a greater height above the ground than an inner end of the support arm.

10. The machine according to claim 1, wherein the support arm is moved from its work configuration towards its transport configuration by pivoting upwards and towards the rear with respect to the chassis.

* * * * *